United States Patent
Grieve

(10) Patent No.: US 8,537,180 B1
(45) Date of Patent: Sep. 17, 2013

(54) SYSTEM AND METHOD FOR VIEWING CONTENT

(75) Inventor: Andrew Alexander Grieve, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/424,729

(22) Filed: Mar. 20, 2012

(51) Int. Cl.
*G09G 5/00* (2006.01)
*G06F 3/041* (2006.01)

(52) U.S. Cl.
USPC .......................................... 345/660; 345/173

(58) Field of Classification Search
USPC ........................... 345/156, 173, 660; 715/798
See application file for complete search history.

(56) References Cited

U.S. PATENT DOCUMENTS

| | | | |
|---|---|---|---|
| 2010/0125786 A1* | 5/2010 | Ozawa et al. | 715/702 |
| 2011/0119578 A1* | 5/2011 | Schwartz | 715/702 |
| 2011/0154196 A1* | 6/2011 | Icho et al. | 715/702 |

\* cited by examiner

*Primary Examiner* — Jacinta M Crawford
(74) *Attorney, Agent, or Firm* — Troutman Sanders, LLP; James E. Schutz

(57) ABSTRACT

A system and method for viewing content on a mobile device may include outputting, at a display coupled to a mobile computing device, content viewable at the display, and receiving a first gesture indicative of scroll input having a first velocity. The content may be scrolled at a first effective scroll rate based on the first velocity. A size of the content may be altered by a first zoom factor that is based on the first effective scroll rate. A second gesture indicative of scroll input may be received while the content has a residual zoom factor, the second gesture having a second velocity. The content may be scrolled at a second effective scroll rate based on the second velocity and the residual zoom factor. A size of the content may be altered by a second zoom factor that is based on the second effective scroll rate.

30 Claims, 6 Drawing Sheets

SYSTEM AND METHOD FOR VIEWING CONTENT

BACKGROUND

This disclosure relates to scrolling content on a display.

Scrolling through content is an important function in many computing devices, and is frequently used with web browsers and word processors, for example. Many mobile devices having touch-screens allow users to navigate content displayed on the screen using gestures to scroll through the content by swiping or flicking a finger across the touch-screen. When attempting to navigate through a large document, or other piece of content, such scrolling can be cumbersome, as slowly scrolling through the content can be time consuming, while very quickly scrolling through the content may cause the user to lose perspective and orientation. Similar problems can occur on a desktop or laptop computer and other devices.

SUMMARY

In one aspect, a method, in accordance with this disclosure, may include outputting content viewable at a display operatively coupled to a mobile computing device. A first gesture indicative of a scroll input may be received at a touch-screen interface coupled to the mobile computing device, the first gesture having a first velocity. The content viewable at the display may be scrolled, at a first effective scroll rate based at least in part on the first velocity. The method may also include altering a size of the content by a first zoom factor. The first zoom factor may be based at least in part on the first effective scroll rate. A second gesture indicative of scroll input may be received while the content viewable at the display has a residual zoom factor. The second gesture having a second velocity. The content viewable at the display may be scrolled at a second effective scroll rate based at least in part on the second velocity and the residual zoom factor. The method may also include altering a size of the content by a second zoom factor. The second zoom factor may be based at least in part on the second effective scroll rate.

One or more of the following features or other features described herein may be included, for example. Altering the size of the content by the first zoom factor may be in response to the first effective scroll rate being greater than a threshold scroll rate. The first zoom factor may be based at least in part on the threshold scroll rate and the first effective scroll rate. Altering the size of the content by the second zoom factor may be in response to the second effective scroll rate being greater than a threshold scroll rate. The second zoom factor may be based at least in part on the threshold scroll rate and the second effective scroll rate. Altering the size of the content viewable at the display by at least one of the first zoom factor and the second zoom factor may be configured to scroll the content viewable at the display at a generally constant apparent scroll rate. The apparent scroll rate may be based at least in part on a threshold scroll rate.

The method may also include reducing at least one of the first effective scroll rate and the second effective scroll rate over time. The method may also include altering at least one of the first zoom factor and the second zoom factor based at least in part on at least one of a first reduced effective scroll rate and a second reduced effective scroll rate. The altering may be configured to scroll the content viewable at the display at an apparent scroll rate. The apparent scroll rate may be based at least in part on a threshold scroll rate. An apparent scroll rate may be reduced when at least one of a first reduced effective scroll rate and a second reduced effective scroll rate is less than a threshold scroll rate. An apparent scroll rate of the content viewable at the display may be based at least in part on at least one of a first decelerated effective scroll rate and a second decelerated scroll rate.

The residual zoom factor may be based at least in part on a decelerated first effective scroll rate. The method may also include receiving a gesture indicative of a request to stop scrolling, and ending scrolling of the content viewable at the display. The size of the content may be altered to provide an original zoom factor. Altering the size of the content by the first zoom factor may include gradually altering the zoom factor applied to the content until the first zoom factor is attained. The second effective scroll rate may be greater than the first effective scrolling rate, and the second zoom factor may be greater than the first zoom factor. Altering the size of the content by the first zoom factor may be effected concurrently with at least part of the scrolling at the first effective scroll rate. Altering the size of the content by the second zoom factor may be effected concurrently with at least part of the scrolling at the second effective scroll rate.

In another aspect, a non-transitory processor-readable storage medium, in accordance with this disclosure, may include instructions stored thereon. When executed by a processor, the instructions may cause the processor to perform operations including outputting content viewable at a display operatively coupled to a mobile computing device. A first gesture indicative of scroll input may be received at a touch-screen interface coupled to the mobile computing, the first gesture having a first velocity. The content viewable at the display may be scrolled, at a first effective scroll rate based at least in part on the first velocity. The instructions may also cause the processor to alter a size of the content by a first zoom factor. The first zoom factor may be based at least in part on the first effective scroll rate. A second gesture indicative of scroll input may be received while the content viewable at the display has a residual zoom factor. The second gesture having a second velocity. The content viewable at the display may be scrolled at a second effective scroll rate based at least in part on the second velocity and the residual zoom factor. Instructions may also be included for altering a size of the content by a second zoom factor. The second zoom factor may be based at least in part on the second effective scroll rate.

One or more of the following features or other features described herein may be included, for example. Altering the size of the content by the first zoom factor may be in response to the first effective scroll rate being greater than a threshold scroll rate. The first zoom factor may be based at least in part on the threshold scroll rate and the first effective scroll rate. Altering the size of the content by the second zoom factor may be in response to the second effective scroll rate being greater than a threshold scroll rate. The second zoom factor may be based at least in part on the threshold scroll rate and the second effective scroll rate. Altering the size of the content viewable at the display by at least one of the first zoom factor and the second zoom factor may be configured to scroll the content viewable at the display at a generally constant apparent scroll rate. The apparent scroll rate may be based at least in part on a threshold scroll rate.

Instructions may also be included for reducing at least one of the first effective scroll rate and the second effective scroll rate over time. Instructions may also be included for altering at least one of the first zoom factor and the second zoom factor based at least in part on at least one of a first reduced effective scroll rate and a second reduced effective scroll rate. The altering may be configured to scroll the content viewable at the display at an apparent scroll rate. The apparent scroll rate may be based at least in part on a threshold scroll rate. An apparent scroll rate may be reduced when at least one of a first reduced effective scroll rate and a second reduced effective scroll rate is less than a threshold scroll rate. An apparent scroll rate of the content viewable at the display may be based at least in part on at least one of a first decelerated effective scroll rate and a second decelerated scroll rate.

The residual zoom factor may be based at least in part on a decelerated first effective scroll rate. Altering the size of the content by the first zoom factor may be effected concurrently with at least part of the scrolling at the first effective scroll rate. Altering the size of the content by the second zoom factor is effected concurrently with at least part of the scrolling at the second effective scroll rate.

In another aspect, a computing system, in accordance with this disclosure, may include one or more processors configured to output, at a display operatively coupled to a mobile computing device, content viewable at the display. The one or more processors may also be configured to receive, at a touchscreen interface, a first gesture indicative of scroll input, the first gesture having a first velocity. The one or more processors may be configured to scroll, at a first effective scroll rate based at least in part on the first velocity, the content viewable at the display. The one or more processors may be configured to alter a size of the content by a first zoom factor in response to the first effective scroll rate being greater than a threshold scroll rate, the first zoom factor being based at least in part on the first effective scroll rate. The one or more processors may be configured to receive, a second gesture indicative of scroll input, while the content viewable at the display has a residual zoom factor, the second gesture having a second velocity. The one or more processors may be configured to scroll, at a second effective scroll rate based at least in part on the second velocity and the residual zoom factor, the content viewable at the display. The one or more processors may also be configured to alter a size of the content by a second zoom factor in response to the second effective scroll rate being greater than the threshold scroll rate, the second zoom factor being based at least in part on the second effective scroll rate.

One or more of the following features or other features described herein may be included, for example. The first zoom factor may be based at least in part on the threshold scroll rate and the first effective scroll rate. The second zoom factor may be based at least in part on the second effective scroll rate the threshold scroll rate and the second effective scroll rate. The one or more processors may be configured to alter the size of the content viewable at the display by at least one of the first zoom factor and the second zoom factor are configured to scroll the content viewable at the display at generally constant apparent scroll rate. The apparent scroll rate based at least in part on a threshold scroll rate.

One or more processors may be configured to reduce at least one of the first effective scroll rate and the second effective scroll rate over time. One or more processors may be configured to alter at least one of the first zoom factor and the second zoom factor based at least in part on at least one of a first reduced effective scroll rate and a second reduced effective scroll rate. The altering may be configured to scroll the content viewable at the display at an apparent scroll rate. The apparent scroll rate may be based at least in part on a threshold scroll rate. One or more processors may be configured to reduce an apparent scroll rate when at least one of a first reduced effective scroll rate and a second reduced effective scroll rate is less than a threshold scroll rate. An apparent scroll rate of the content viewable at the display may be based at least in part on at least one of a first decelerated effective scroll rate and a second decelerated scroll rate. The residual zoom factor may be based at least in part on a decelerated first effective scroll rate.

In another aspect, a computer-implemented method, in accordance with this disclosure, may include, monitoring a touch screen interface configured to output viewable content and receive gestures indicating of scroll commands; and adjusting the effective scroll rate and size of the content on the touch screen in response to the velocities of the received gestures to permit increased or decreased effective scroll rates while maintaining a relatively constant effective scroll rate by altering the size of the content to achieve the increased or decreased effective scroll rates.

The method may also include other features described herein, for example. Altering the size of the content by the first zoom factor is effected concurrently with at least part of the scrolling at the first effective scroll rate, and wherein altering the size of the content by the second zoom factor is effected concurrently with at least part of the scrolling at the second effective scroll rate.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
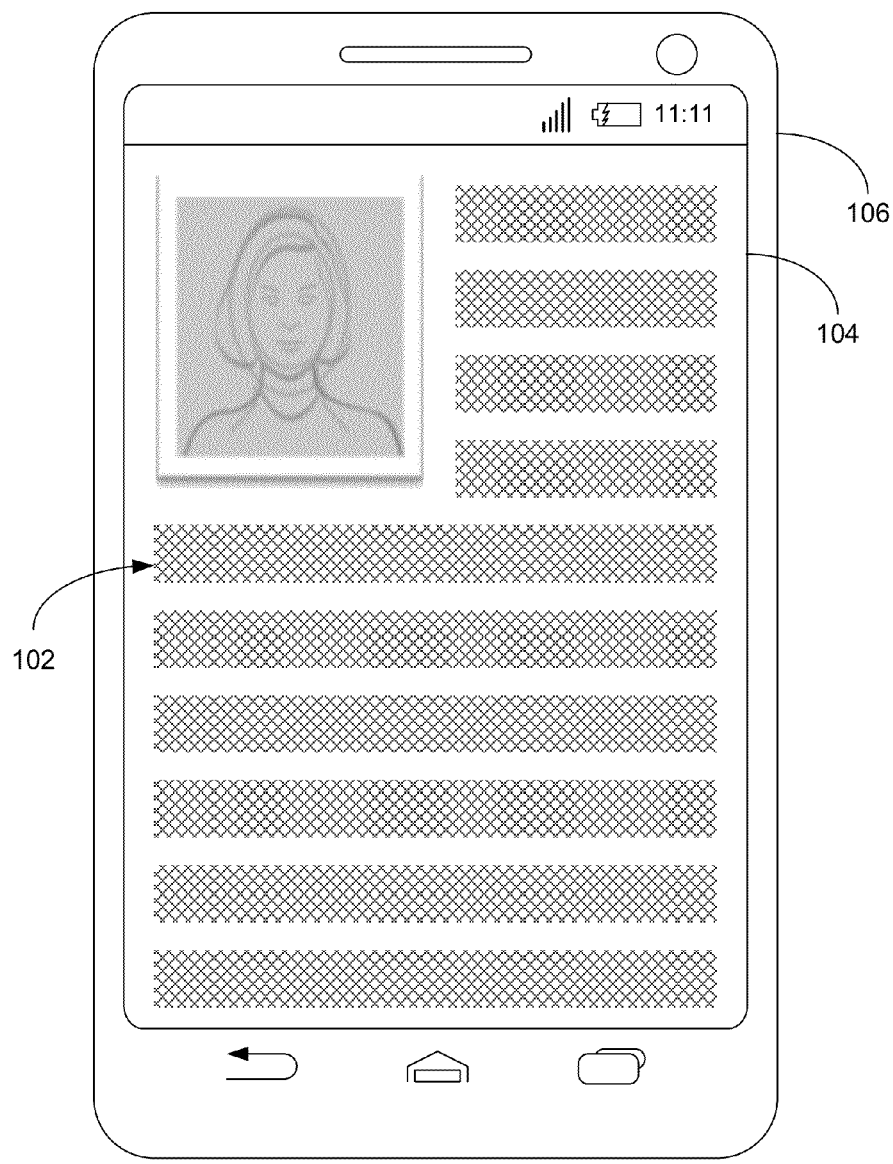
FIG. 1 is a diagrammatic view of an example of a method for viewing content on a mobile device in accordance with an embodiment of the disclosure.

Embodiments disclosed herein generally concern a novel methodology for providing more context while quickly scrolling through content, e.g., on a portable computing device (e.g. a smartphone). In some cases, when quickly scrolling through content on a portable computing device, the content may become blurred, or difficult to track, due to the high rate of scrolling. Consequently, the user may experience difficulty determining where they are in content being navigated.

Embodiments described herein may provide more context while a user is quickly scrolling through content by altering the size of the content displayed on the viewport, or display, of the portable computing device. In some embodiments, the content may be reduced in size, which may provide the user with a greater overall context of the portion of the content being displayed. The size of the content may be altered when the scroll speed is greater than a threshold scroll speed. In some embodiments, the size of the content being displayed may be further altered when subsequent scrolling gestures are received.

As discussed above, and referring also to FIGS. 1-5, a content scrolling process 10 may generally output 502, at a display operatively coupled to a computing device, content viewable at the display. The content scrolling process 10 may receive 500, at the computing device, a first gesture indicative of a scroll input. The first gesture may have a first velocity. The content scrolling process 10 may scroll 504 the content viewable at the display at a first effective scroll rate based at least in part on the first velocity. If the first effective scroll rate is greater than a threshold scroll rate, the content scrolling process 10 may alter 506 the size of the content by a first zoom factor. The first zoom factor may be based at least in part on the threshold scroll rate and the first effective scroll rate. In some embodiments, the first zoom factor may be at least generally proportional to the first effective scroll rate. The content scrolling process 10 may also receive 508 a second gesture indicative of a scroll input. The second gesture may have a second velocity. The content scrolling process 10 may scroll 510 the content viewable at the display at a second effective scroll rate based at least in part on the second velocity and a residual zoom factor. If the second effective scroll rate is greater than the threshold scroll rate, the content scrolling process may alter 512 a size of the content by a second zoom factor. The second zoom factor may be based at least in part on the second effective scroll rate and the threshold scroll rate.

For example, and referring to FIG. 1, a diagram 100 depicting one embodiment in accordance with the content scrolling process 10 is provided. In operation, a user (not shown) may navigate content 102 (e.g., such as a document, a web page, a map, or other viewable content, which may include text only, text and graphics, and/or graphics only) displayed on a display, or viewport, 104 of a computing device 106. The content 102 may be output 500 to the display 104 by the content scrolling process 10 and/or by another process (e.g., such as a web browser, a PDF reader, a document reader, a word processor, or other content viewing process or application alone, and/or in conjunction with the content scrolling process 10). In order to navigate the content, for example to view a portion of the content other than that portion currently displayed on the display 104, the user may scroll the content. For example, the user may move her finger across the display 104 in an upward direction to scroll the content upwardly to navigate the content. In response to the user moving her finger across the display 104, the content scrolling process 10 may receive 502 a first gesture indicative of a scroll input. In other embodiments, the user may move her finger across the display in a side to side direction (e.g., left to right direction) to scroll the content from side to side to navigate the content. The first gesture may have a first velocity, e.g., which may be based at least in part on the speed at which the user moved her finger across the display 104.

In response to the first gesture, the content scrolling process 10 may scroll 504 the content 102 viewable at the display 104 at a first effective scroll rate based at least in part on the first velocity. For example, if the user moved her finger in an upward direction across the display 104 beginning at a velocity of 0 pixels per second and ending at a velocity of 800 pixels per second (e.g., at a constant acceleration), the content scrolling process 10 may scroll 504 the content in an upward direction at a first effective scroll rate of 800 pixels per second. As such, the speed at which the content 102 is scrolled may be based at least in part on the first velocity (i.e., the speed of the user's finger movement). If the first effective scroll rate (e.g., 800 pixels per second in the above example) is greater than a threshold scroll rate, the content scrolling process 10 may further alter 506 the size of the content 102 by a first zoom factor.

In an embodiment, the threshold scroll rate may be a minimum scroll rate to alter the size of the content 102 viewable at the display by the first zoom factor. For example, if the first effective scroll rate is less than the threshold scroll rate, the content 102 may be scrolled across the display 104 without any change in size of the content viewable at the display 104. However, if the first effective scroll rate is greater than the threshold scroll rate, the size of the content 102 may be altered while scrolling. In an example embodiment, the threshold scroll rate may be 400 pixels per second. The threshold scroll rate and the various effective scroll rates discussed herein are intended for illustrative purposes only and should not be construed as a limitation on the present disclosure. The first effective scroll rate may be a scroll rate of the content 102 if the size had not been altered.

Figure 2:
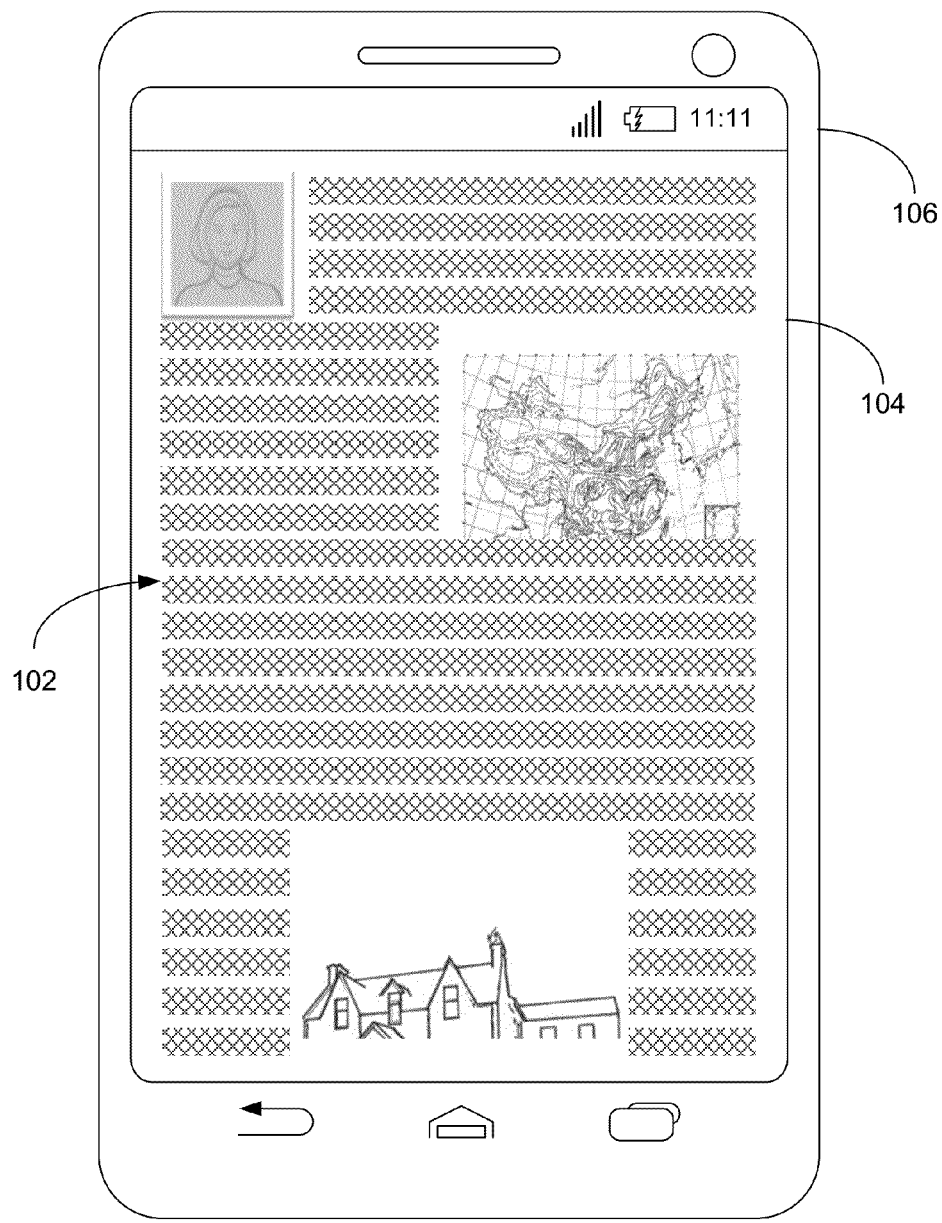
FIG. 2 is a diagrammatic view of an example of a method for viewing content on a mobile device in accordance with an embodiment of the disclosure.

Referring to the diagram 200 of FIG. 2, in the above-example in which the first gesture has a velocity of 800 pixels per second, the first effective scroll rate may also be 800 pixels per second, which is greater than the example threshold scroll rate is 400 pixels per second. Because the first effective scroll rate of 800 pixels per second is greater than the threshold scroll rate of 400 pixels per second, the content scrolling process 10 may alter 506 the size of the content 102 by a first zoom factor. The first zoom factor may be based at least in part on the threshold scroll rate and the first effective scroll rate. For example, the first zoom factor may be a function of the ratio of the threshold scroll rate to the first effective scroll rate, that is 400 pixels per second divided by 800 pixels per second. In such an embodiment, the first zoom factor may be 0.5. The content scrolling process 10 may therefore alter 506 the size of the content 102 by a zoom factor of 0.5. In such an embodiment, the content scrolling process 10 may provide a zoomed-out display of the content 102, which may appear half the size (and thereby display twice as much content) compared to the size and quantity of the content shown in diagram 100.

For example, in some embodiments, one approach to calculating the zoom factor may be based, at least in part, on the formula:

ZOOM_FACTOR=MAX(1,THRESHOLD SCROLL RATE/EFFECTIVE SCROLL RATE)

In addition to altering the size of the content 102 displayed in display 104, the scrolling process 10 may scroll the content at an apparent scroll rate based at least in part on the threshold scroll rate. That is, the zoomed-out content 102 in diagram 200 may scroll across display 104 at an apparent scroll rate of 400 pixels per second. In other embodiments, the zoomed-out content may be scrolled at rates other than the threshold scroll rate. Based on the example apparent scroll rate of 400 pixels per second and the first zoom factor of 0.5, the content may be scrolled at an effective scroll rate of 800 pixels per second. That is, the scroll rate of the content 102 would be 800 pixels per second at a zoom factor of 1.0 (i.e., at the size of the content 102 prior to the size being altered). In addition/as an alternative the scroll rate may be based upon, at least in part, a line per second scroll rate. In such an embodiment, the lines per second scroll rate may be based upon, at least in part, a number of lines based on zoom factor of the content prior to being altered and/or a number of lines based on a zoom factor of the content after the size of the content has been altered.

In some embodiments, the first effective scroll rate of the content 102 may be reduced 514 over time. For example, a momentum scrolling effect may be utilized in which the rate at which the content 102 is scrolling across the display 104 may gradually slow, e.g., and may eventually stop scrolling. The momentum scrolling effect can simulate friction. In some implementations, scrolling is reduced at a constant deceleration rate. In some embodiments, scrolling is reduced as a terminus (e.g., beginning or end) of the content is reached, e.g., to avoid an abrupt stop.

In some embodiments, the scrolling process 10 may alter 516 the first zoom factor based at least in part on the reduced 514 first effective scroll rate to provide an apparent scroll rate of the content 102 based at least in part on the threshold scroll rate. For example, as long as the first effective scroll rate is greater than the threshold scroll rate, the zoom factor may be altered to provide a relatively constant apparent scroll rate, i.e., the rate at which the displayed content scrolls across the display 104. Accordingly, and referring also to the diagram 300 shown in FIG. 3, if the first effective scroll rate slows from the initial 800 pixels per second to an effective scroll rate of 600 pixels per second (e.g., as a result of momentum scrolling), the scrolling process 10 may alter 516 the first zoom factor based on the reduced first effective scroll rate of 600 pixels per second. For example, and as shown in the diagram 300 of FIG. 3, based at least in part on the reduced 514 first effective scroll rate of 600 pixels per second (e.g., reduced from an initial first effective scroll rate of 800 pixels per second), the first zoom factor may be increased, thereby providing a relatively less zoomed-out view of the content 102 viewable at the display 104.

In some embodiments, the scrolling process 10 may alter 516 the first zoom factor based on the reduced 514 first effective scroll rate and the threshold scroll rate. For example, the first zoom factor may be the ratio of the threshold scroll rate to the reduced effective scroll rate. In the above example embodiment in which the threshold scroll rate is 400 pixels per second and the reduced effective scroll rate is 600 pixels per second, the altered first zoom factor may be 0.67. The altered first zoom factor may be a residual zoom factor, being a portion of the first zoom factor remaining after the first zoom factor has been altered as a result of the reduction of the first effective scroll rate (e.g., based at least in part on momentum scrolling). As such, the altered first zoom factor may be greater than the original first zoom factor of 0.5, thereby providing a less zoomed-out view of the content 102, and also thereby resulting in a relatively smaller amount of the overall content being displayed as compared to the first zoom factor shown in diagram 200 in FIG. 2.

In such an embodiment, when the effective scroll rate is greater than the threshold scroll rate, the zoom factor may be altered to provide a relatively constant apparent scroll rate. In some embodiments, the first zoom factor may be continuously altered as the first effective scroll rate is reduced (e.g., as a result of momentum scrolling). In some embodiments, the first zoom factor may be altered in steps, for example with the first zoom factor being altered for every 50 pixel per second reduction in the first effective scroll rate. Other stepwise alterations of the first zoom factor may be utilized (e.g., altering the first zoom factor for every 100 pixel per second reduction in the first effective scroll rate, or the like). In some embodiments, the zoom factor may be altered to provided a relatively constant apparent scroll rate (e.g., in which the zoom factor may be at least partially proportional to the effective scroll rate), and may not, for example, be based upon a threshold scroll rate.

In some embodiments, the content scrolling process 10 may received 508 a second gesture indicative of a scroll input. The second gesture may have a second velocity. For example, similar to the first gesture, the user may again move her finger across the display 104, e.g., to continue scrolling the content 102 and/or to increase the scroll rate of the content 102. In response to receiving 508 the second gesture, the content scrolling process 10 may scroll 510 the content viewable at the display at a second effective scroll rate based at least in part on the second velocity and a residual zoom factor. In some embodiments, the residual zoom factor may be based at least in part on a decelerated, or reduced, first effective scroll rate. As described with respect to the above-example in which the first effective scroll rate had been reduced (e.g., due to momentum scrolling) from 800 pixels per second to 600 pixels per second, the first zoom factor was altered from an original zoom factor of 0.5 to a residual zoom factor of 0.67.

In an example embodiment, the second gesture may have a second velocity of 800 pixels per second and the residual zoom factor may be 0.67, as described in the above-example. The second effective scroll rate may be the second velocity divided by the residual zoom factor. Accordingly, in the foregoing example of a second gesture velocity of 800 pixels per second and a residual zoom factor of 0.67, the second effective scroll rate may be approximately 1194 pixels per second. Accordingly, the content scrolling process 10 may scroll the content 102 at the second effective scroll rate of 1194 pixels per second.

If the second effective scroll rate is greater than the threshold scroll rate, the content scrolling process 10 may alter 512 a size of the content by a second zoom factor. Continuing with the above-example in which the second effective scroll rate may be 1194 pixels per second, which is greater than the example threshold scroll rate of 400 pixels per second, the scrolling process 10 may alter the size of the content by the second zoom factor. The second zoom factor may be based at least in part on the second effective scroll rate and the threshold scroll rate. In an example embodiment, the second zoom factor may be the ratio of the threshold scroll rate to the second effective scroll rate. Accordingly, in the above example in which the threshold scroll rate may be 400 pixels per second and the second effective scroll rate may be 1194 pixels per second, the second zoom factor may be 0.335. As shown in the diagram 400 in FIG. 4, as the second zoom factor may be less than the first zoom factor, a greater amount of the content 102 may be displayed within the display 104.

Figure 3:
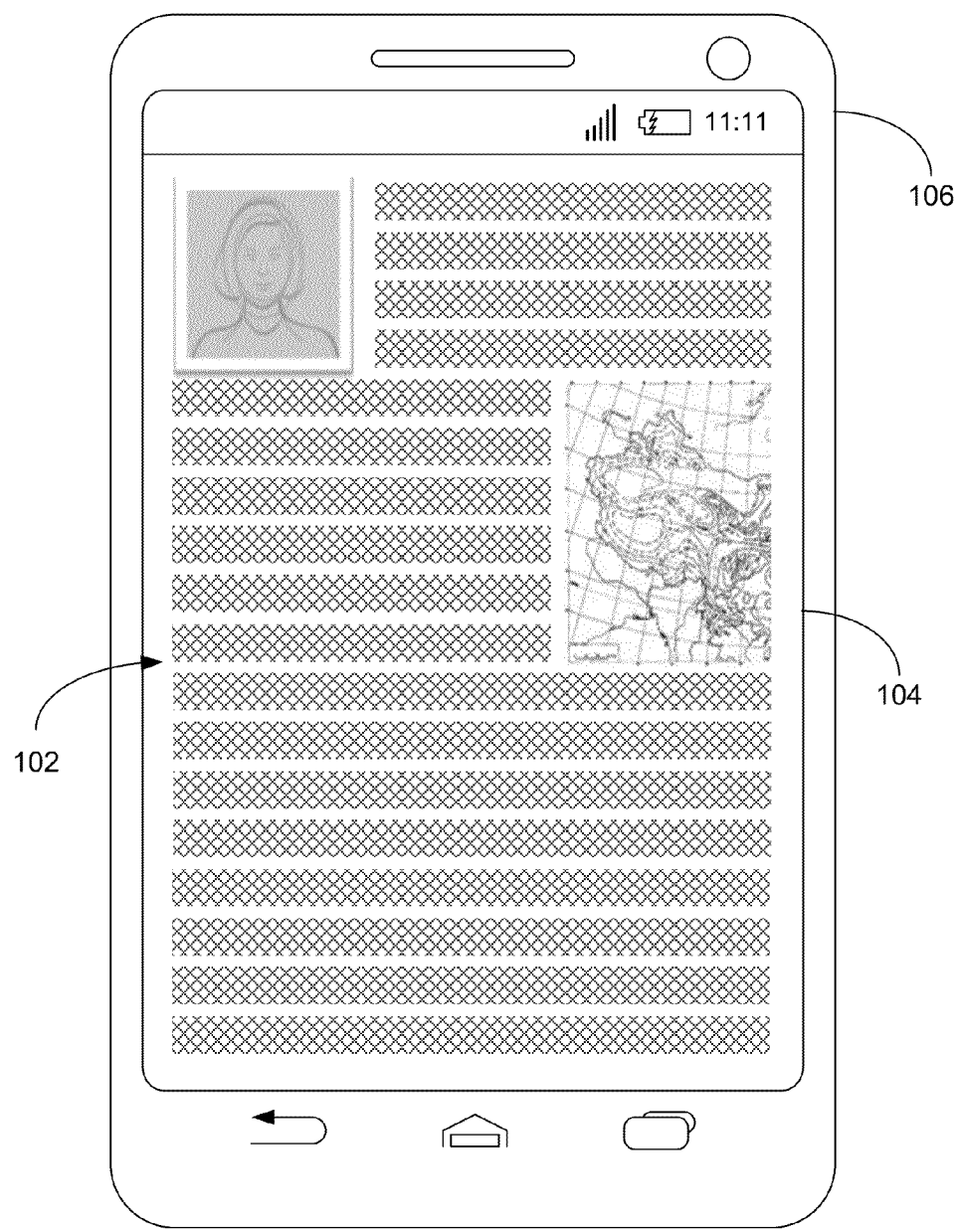
FIG. 3 is a diagrammatic view of an example of a method for viewing content on a mobile device in accordance with an embodiment of the disclosure.
Figure 4:
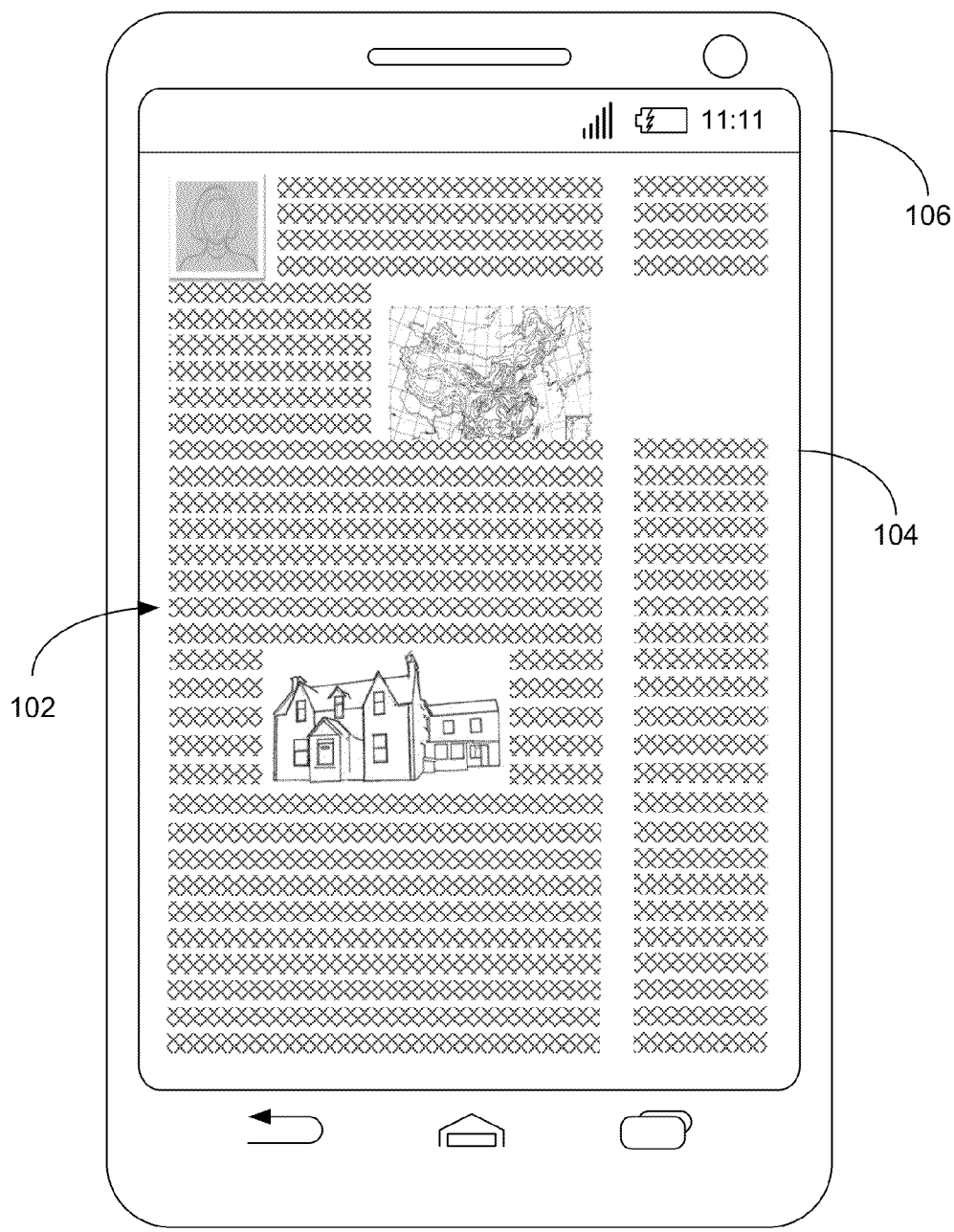
FIG. 4 is a diagrammatic view of an example of a method for viewing content on a mobile device in accordance with an embodiment of the disclosure.
Figure 5:
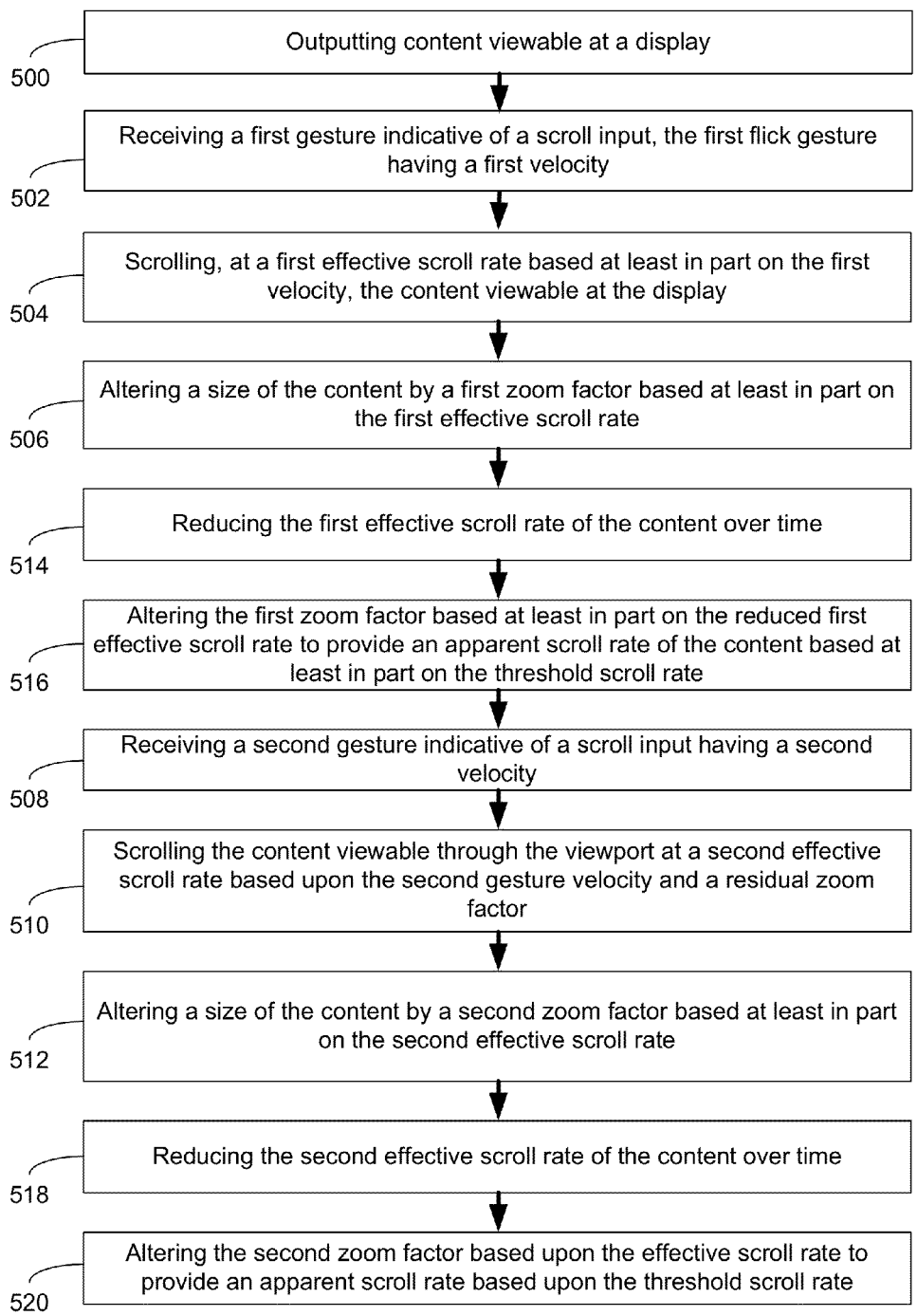
FIG. 5 is a flowchart of an example of a method for viewing content on a mobile device in accordance with an embodiment of the present disclosure.

In some embodiments, the content 102 displayed at the second zoom factor may have an apparent scroll rate based at least in part on the threshold scroll rate. For example, the content having a second effective scroll rate of 1194 pixels per second and a second zoom factor of 0.335 may have an apparent scroll rate of 400 pixels per second. The greater amount of the content 102 displayed within the display 104 (e.g., based on the second zoom factor) may be scrolled at the apparent scroll rate, which may allow the content 102 to be navigated (e.g., by scrolling) more quickly than when the content is at a larger zoom factor (e.g., as shown in FIGS. 1-3), while providing greater context, e.g., with respect to the portion of the content being displayed.

In a similar manner as described above, the second effective scroll rate may be reduced 518 over time, e.g., based at least in part on the use of momentum scrolling. Also, in a similar manner as described above, the second zoom factor may be altered 520 based at least in part on a reduced second effective scroll rate. Altering the second zoom factor based at least in part on the reduced second apparent scroll rate may result in the content 102 displayed in the display 104 having a generally constant apparent scroll rate, e.g., which may include an apparent scroll rate based at least in part on the threshold scroll rate.

In some embodiments, the first effective scroll rate and/or the second effective scroll rate may be reduced (e.g., based at least in part on momentum scrolling) to a reduced effective scroll rate that is less than the threshold scroll rate. As described above, in some embodiments, one or both of the first zoom factor and the second zoom factor may be altered based at least in part on a reduction in the effective scroll rate to provide an apparent scroll rate of the content that is based at least is part on the reduced, or decelerated, effective scroll rate and based at least in part on the threshold scroll rate. In such an embodiment, the zoom factors may be altered until a zoom factor of 1 (e.g., the original zoom factor) is achieved, and the effective scroll rate is equal to the apparent scroll rate. In some embodiments, the effective scroll may continue to be reduced, e.g., based at least in part on momentum scrolling. In such an embodiment, the apparent scroll rate of the content 102 viewable at the display 104 may be based at least in part on the reduced first effective scroll rate or the reduced second effective scroll rate, e.g., which may continue to decelerate until scrolling is stopped (e.g., based at least in part on momentum scrolling). In some embodiments, when the effective scroll rate is equal to the apparent scroll rate, the zoom factor may remain constant (e.g., at a zoom factor of 1) until scrolling is stopped.

In some embodiments, when the content 102 viewable at the display 104 is scrolling at an effective scroll rate greater than the threshold scroll rate (e.g., and a size of the content is altered relative to the original zoom factor of 1), scrolling of the content 102 may be stopped in response to the scrolling process 10 receiving a gesture other than a gesture. For example, the user may touch the display 104 without applying a gesture indicative of a scroll input. In response to receiving the gesture that is not indicative of a scroll input, scrolling of the content may be stopped, and the size of the content may be altered to provide the original zoom factor (e.g., a zoom factor of 1).

Figure 6:
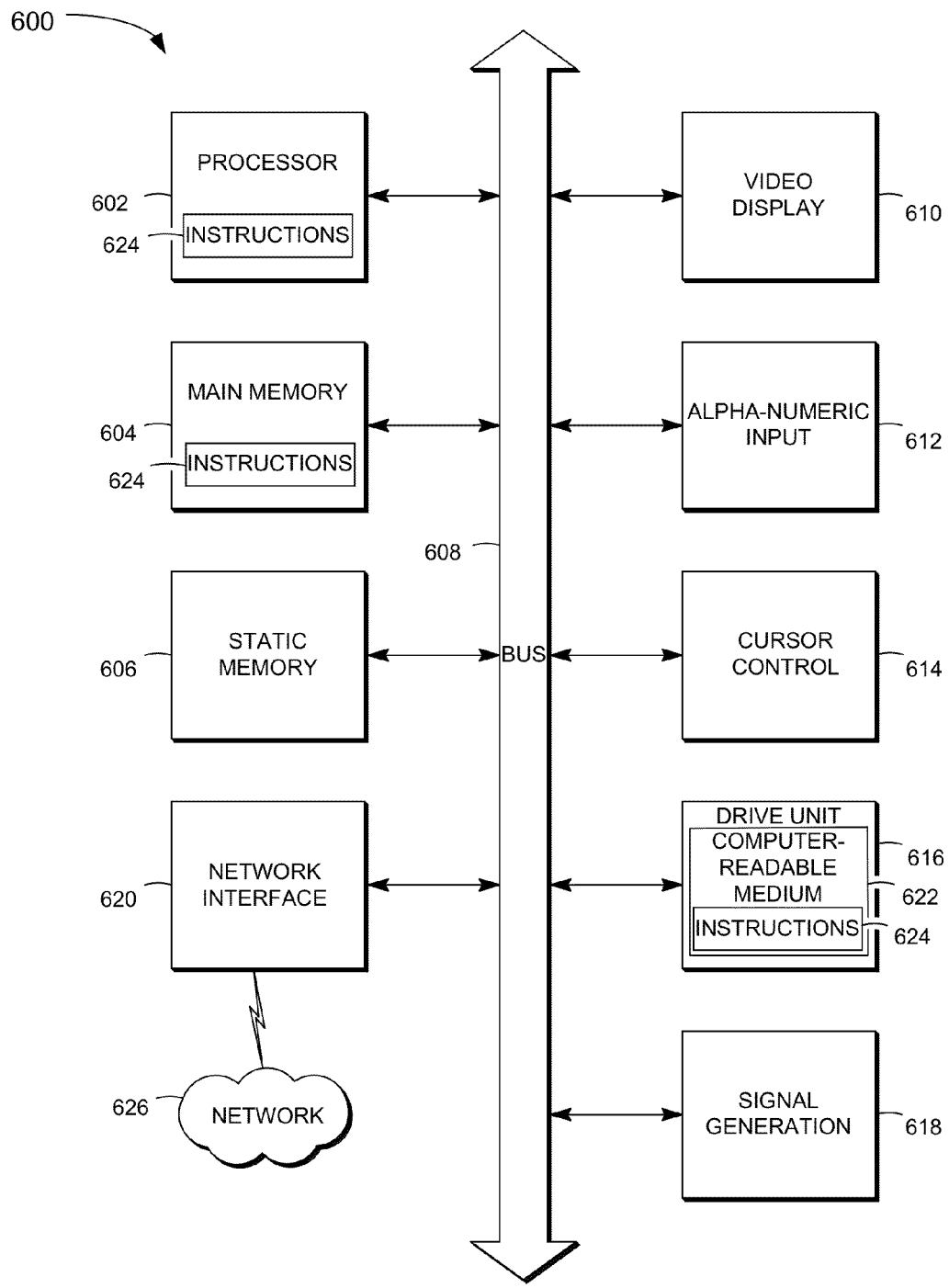
FIG. 6 is a block diagram of an example of a mobile device that implements a content viewing technique described herein.

FIG. 6 shows a block diagram of a machine in the example form of a computer system 600 within which a set of instructions may be executed causing the machine to perform any one or more of the methods, processes, operations, or methodologies discussed herein. The portable computing device 106 may include the functionality of the one or more computer systems 600.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be, for example, a client computer, a personal computer (PC), a tablet device, a gaming device, a set-top box (STB), a Personal Digital Assistant (PDA), a cellular telephone, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 further includes a video display unit 610 (e.g., a liquid crystal display (LCD), an organic light emitting diode (OLED) display unit or the like). The computer system 600 also includes an alphanumeric input device 612 (e.g., a keyboard, a touch-screen interface, or the like), a cursor control device 614 (e.g., a touch-screen interface, a track pad, a track ball, or the like), a drive unit 616, a signal generation device 618 (e.g., a speaker) and a network interface device 620.

The drive unit 616 includes a computer-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting computer-readable media.

The software 624 may further be transmitted or received over a network 626 via the network interface device 620.

While the computer-readable medium 622 is shown in an example embodiment to be a single medium, the term "computer-readable medium" includes a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies described herein. The term "computer-readable medium" shall accordingly be taken to include, but not be limited to, solid-state memories, and optical media, and magnetic media. In some embodiments, the computer-readable medium is a non-transitory computer-readable medium.

The methods described herein do not have to be executed in the order described, or in any particular order. Moreover, various activities described with respect to the methods identified herein can be executed in serial or parallel fashion.

The foregoing description, for purpose of explanation, has been described with reference to specific embodiments. However, the illustrative discussions above are not intended to be exhaustive or limiting, as many modifications and variations are possible in view of the above teachings. Other embodiments are within the scope of the following claims.

What is claimed is:

1. A computer-implemented method comprising:
    outputting, by a processor and for display, content;
    receiving, by the processor, an indication of a first scroll input, the first scroll input having a first velocity;
    scrolling, at a first effective scroll rate determined based at least in part on the first velocity, the content;
    altering a size of the content by a first zoom factor, the first zoom factor being determined based at least in part on the first effective scroll rate;
    receiving, at the processor, an indication of a second scroll input, while the content has a residual zoom factor, the second scroll input having a second velocity;
    scrolling, at a second effective scroll rate determined based at least in part on the second velocity and the residual zoom factor, the content; and
    altering an output size of the content by a second zoom factor, the second zoom factor being based at least in part on the second effective scroll rate.

2. The computer-implemented method of claim 1, wherein altering the size of the content by the first zoom factor is in response to the first effective scroll rate being greater than a threshold scroll rate; and
    wherein the first zoom factor is based at least in part on the threshold scroll rate and the first effective scroll rate.

3. The computer-implemented method of claim 1, wherein altering the size of the content by the second zoom factor is in response to the second effective scroll rate being greater than a threshold scroll rate, wherein the second zoom factor is based at least in part on the threshold scroll rate and the second effective scroll rate.

4. The computer-implemented method of claim 1, wherein altering the size of the content by at least one of the first zoom factor and the second zoom factor is configured to scroll the content at a generally constant apparent scroll rate.

5. The computer-implemented method of claim 4, wherein the generally constant apparent scroll rate is based at least in part on a threshold scroll rate.

6. The computer-implemented method of claim 1, further comprising:
   reducing at least one of the first effective scroll rate and the second effective scroll rate over time.

7. The computer-implemented method of claim 6, further comprising:
   altering at least one of the first zoom factor and the second zoom factor based at least in part on at least one of a first reduced effective scroll rate and a second reduced effective scroll rate, the altering configured to scroll the content at a generally constant apparent scroll rate.

8. The computer-implemented method of claim 7, wherein the generally constant apparent scroll rate is based at least in part on a threshold scroll rate.

9. The computer-implemented method of claim 6, further comprising:
   reducing an apparent scroll rate when at least one of a first reduced effective scroll rate and a second reduced effective scroll rate is less than a threshold scroll rate.

10. The computer-implemented method of claim 6, wherein an apparent scroll rate of the content is based at least in part on at least one of a first decelerated effective scroll rate and a second decelerated scroll rate.

11. The computer-implemented method of claim 1, wherein the residual zoom factor is based at least in part on a decelerated first effective scroll rate.

12. The computer-implemented method of claim 1, further comprising:
   receiving, at the processor, an indication of a third gesture indicative of a request to stop scrolling;
   ending the scrolling of the content; and
   altering the size of the content to provide an original zoom factor.

13. The computer-implemented method of claim 1, wherein altering the size of the content by the first zoom factor includes gradually altering the zoom factor applied to the content until the first zoom factor is attained.

14. The computer-implemented method of claim 1, wherein the second effective scroll rate is greater than the first effective scroll rate; and wherein the second zoom factor is greater than the first zoom factor.

15. The computer-implemented method of claim 1, wherein altering the size of the content by the first zoom factor is affected concurrently with at least part of the scrolling at the first effective scroll rate, and wherein altering the size of the content by the second zoom factor is affected concurrently with at least part of the scrolling at the second effective scroll rate.

16. A non-transitory processor-readable storage medium having a plurality of instructions stored thereon that when executed by a processor, cause the processor to perform operations to:
   output, for display, content;
   receive, by the processor, an indication of a first scroll input, the first scroll input having a first velocity;
   scroll, at a first effective scroll rate determined based at least in part on the first velocity, the content;
   alter a size of the content by a first zoom factor, the first zoom factor being based at least in part on the first effective scroll rate;
   receive, at the processor, an indication of a second scroll input, while the content has a residual zoom factor, the second scroll input having a second velocity;
   scroll, at a second effective scroll rate determined based at least in part on the second velocity and the residual zoom factor, the content;
   alter a size of the content by a second zoom factor, the second zoom factor being based at least in part on the second effective scroll rate.

17. The non-transitory processor-readable storage medium of claim 16, wherein altering the size of the content by the first zoom factor is in response to the first effective scroll rate being greater than a threshold scroll rate; and
   wherein the first zoom factor is based at least in part on the threshold scroll rate and the first effective scroll rate.

18. The non-transitory processor-readable storage medium of claim 16, wherein altering the size of the content by the second zoom factor is in response to the second effective scroll rate being greater than a threshold scroll rate; and
   wherein the second zoom factor is based at least in part on the threshold scroll rate and the second effective scroll rate.

19. The non-transitory processor-readable storage medium of claim 16, further comprising:
   reducing at least one of the first effective scroll rate and the second effective scroll rate over time.

20. The non-transitory processor-readable storage medium of claim 19, further comprising:
   reducing an apparent scroll rate when at least one of a first reduced effective scroll rate and a second reduced effective scroll rate is less than a threshold scroll rate.

21. The non-transitory processor-readable storage medium of claim 19, wherein an apparent scroll rate of the content is based at least in part on at least one of a first decelerated effective scroll rate and a second decelerated scroll rate.

22. The non-transitory processor-readable storage medium of claim 16, wherein the residual zoom factor is based at least in part on a decelerated first effective scroll rate.

23. A computing system, comprising one or more processors configured to:
   output, for display, content;
   receive an indication of a first scroll input, the first scroll input having a first velocity;
   scroll, at a first effective scroll rate based at least in part on the first velocity, the content;
   alter a size of the content by a first zoom factor in response to the first effective scroll rate being greater than a threshold scroll rate, the first zoom factor being determined based at least in part on the first effective scroll rate;
   receive an indication of a second scroll input, while the content has a residual zoom factor, the second scroll input having a second velocity;
   scroll, at a second effective scroll rate determined based at least in part on the second velocity and the residual zoom factor, the content; and
   alter a size of the content by a second zoom factor in response to the second effective scroll rate being greater than the threshold scroll rate, the second zoom factor being based at least in part on the second effective scroll rate.

24. The system of claim 23, wherein the one or more processors configured to alter the size of the content viewable at the display by at least one of the first zoom factor and the second zoom factor are further configured to scroll the content viewable at the display at a generally constant apparent scroll rate.

25. The system of claim 24, wherein the generally constant apparent scroll rate is based at least in part on a threshold scroll rate.

26. The system of claim 23, further comprising:
one or more processors configured to reduce at least one of the first effective scroll rate and the second effective scroll rate over time.

27. The system of claim 26, further comprising:
one or more processors configured to alter at least one of the first zoom factor and the second zoom factor based at least in part on at least one of a first reduced effective scroll rate and a second reduced effective scroll rate, the altering configured to scroll the content viewable at the display at a generally constant apparent scroll rate.

28. The system of claim 26, further comprising:
one or more processors configured to reduce an apparent scroll rate when at least one of a first reduced effective scroll rate and a second reduced effective scroll rate is less than a threshold scroll rate.

29. The system of claim 26, wherein an apparent scroll rate of the content viewable at the display is based at least in part on at least one of a first decelerated effective scroll rate and a second decelerated scroll rate.

30. The system of claim 23, wherein altering the size of the content by the first zoom factor is affected concurrently with at least part of the scrolling at the first effective scroll rate, and wherein altering the size of the content by the second zoom factor is affected concurrently with at least part of the scrolling at the second effective scroll rate.

* * * * *